United States Patent
Lahti et al.

(10) Patent No.: US 7,171,175 B2
(45) Date of Patent: Jan. 30, 2007

(54) METHOD FOR RECEIVING RADIO FREQUENCY SIGNAL AND A RECEIVER DEVICE

(75) Inventors: Saku Lahti, Kämmenniemi (FI); Ilkka Kontola, Julkujärvi (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 09/981,101

(22) Filed: Oct. 16, 2001

(65) Prior Publication Data

US 2002/0045427 A1    Apr. 18, 2002

(30) Foreign Application Priority Data

Oct. 17, 2000   (FI) .................................. 20002291

(51) Int. Cl.
*H04B 7/08*    (2006.01)
(52) U.S. Cl. .................. 455/135; 455/273; 455/276.1; 375/349
(58) Field of Classification Search ............ 455/553.1, 455/562.1, 575.7, 132, 137, 139, 140, 141, 455/147, 154.1, 133, 161.2, 151, 167.1, 168.1, 455/170.1, 183.2, 196.1, 273, 276.1, 277.1–277.2, 455/135; 343/444, 445, 465; 375/147, 148, 375/349
See application file for complete search history.

(56) References Cited

U.S. PATENT DOCUMENTS

| | | | | |
|---|---|---|---|---|
| 5,068,668 A | | 11/1991 | Tsuda et al. ................ 342/362 |
| 5,335,251 A | | 8/1994 | Onishi et al. ................ 375/100 |
| 5,634,204 A | * | 5/1997 | Takahashi et al. .......... 455/134 |
| 5,692,019 A | * | 11/1997 | Chang et al. ................ 375/347 |
| 5,949,812 A | * | 9/1999 | Turney et al. ............... 375/130 |
| 6,023,615 A | | 2/2000 | Bruckert et al. ......... 455/277.2 |
| 6,044,120 A | * | 3/2000 | Bar-David et al. ....... 455/276.1 |
| 6,067,449 A | * | 5/2000 | Jager ....................... 455/277.2 |
| 6,301,545 B1 | * | 10/2001 | Brodie ........................ 701/213 |
| 6,334,048 B1 | * | 12/2001 | Edvardsson et al. ..... 455/575.7 |
| 6,408,178 B1 | * | 6/2002 | Wickstrom et al. ......... 455/427 |
| 6,531,985 B1 | * | 3/2003 | Jones et al. ................. 343/702 |
| 6,577,686 B1 | * | 6/2003 | Koga et al. ................. 375/347 |

FOREIGN PATENT DOCUMENTS

| | | |
|---|---|---|
| EP | 0 416 264 | 7/1990 |
| EP | 0416264 A3 | 3/1991 |
| EP | 0889540 A1 | 1/1999 |
| GB | 2 343 814 | 11/1996 |

* cited by examiner

*Primary Examiner*—Daniel Swerdlow
(74) *Attorney, Agent, or Firm*—Perman & Green, LLP

(57) ABSTRACT

In a method (300) for receiving a radio signal, there are steps of: receiving (301, 303) first and second received signal components by use of first and second antennas having different properties; processing (305) a received signal component to produce a sampled signal component; producing (307) at least one combined signal, which is a linear combination of at least two sampled signal components; and selecting (306) at least one set of complex values for coefficients of the linear combination so that a quality of a combined signal is at least equal to the quality of that sampled signal component having the best quality. Furthermore, the antennas are alternately connected (302, 304) via a switching element to radio frequency means so that received signal components are interleaving and so that first and second parts of a certain piece of transmitted information are received with the first and second antennas, respectively. A corresponding receiver device is also presented.

32 Claims, 7 Drawing Sheets

METHOD FOR RECEIVING RADIO FREQUENCY SIGNAL AND A RECEIVER DEVICE

BACKGROUND OF THE INVENTION

The invention relates in general to polarization properties of antennas. In particular the invention relates to adjusting the polarization properties of an antenna based on the polarization properties of a received signal.

Electro-magnetic radiation has certain polarization properties. When receiving signals carried by radio frequency (RF) electro-magnetic radiation, generally the polarization properties of the antenna are matched to those of the incoming signal. If electro-magnetic radiation experiences a reflection, its polarization properties typically change. Therefore there may be need to adjust dynamically the polarization properties of an antenna depending on the path of the radiation from the transmitting antenna to the receiving antenna. Otherwise it is, in the worst case, possible that the polarization properties of an antenna are orthogonal to those of the electro-magnetic radiation that is received using the antenna. In this case the antenna cannot detect the electro-magnetic radiation.

The Global Positioning System (GPS) is used here as an example of a system, where there is need for adjusting the polarization properties of the receiving antenna. GPS is a positioning system, where a receiver device can compute its position using signals it receives from GPS satellites. The GPS system has two services: Standard Positioning Service (SPS) is available for all users and Precise Positioning Service (PPS) is available, for example, for certain military users. Each GPS satellite sends the two positioning signals which are spread spectrum signals. A Coarse Acquisition (C/A) code and a Precise (P) code are modulated to carrier frequencies of 1575.42 MHz and 1227.6 MHz using binary phase shift keying. The C/A code, for example, is a pseudorandom binary code consisting of 1023 chips and it is repeating itself every millisecond. The chip rate of the C/A code is thus 1.023 MHz. The C/A and P codes are GPS satellite specific. The satellites send also navigation information at the data rate of 50 bps.

The GPS transmitters in satellites transmit the digital positioning information using right-handed circularly polarized (RHCP) radiation. When receiving GPS signals, the GPS receiver is usually outdoors and has a direct line of sight (LOS) connection with the GPS satellite. In a LOS connection the received signal (or at least a certain part of the received signal) is not reflected, and the receiver antenna may have the same polarization characteristics as the transmitted radiation.

FIG. 1 presents by the way of example a schematic drawing of the antenna 101 and receiver 110 of a GPS receiver device 100. The antenna 101 is typically a RHCP antenna. An output from the antenna 101 is connected via a preamplifier to the RF part 111 of the receiver 110. In the RF part 111 the received broadband signal is usually first filtered using a band-pass filter, and the result is a RF signal. The RF part further has a local oscillator (LO) and the RF signal is typically mixed with the sinusoid produced by the LO to produce an intermediate frequency (IF) signal. This IF signal, which typically comprises an I (In phase) component and a Q (Quadrature phase) component, is delivered an analog-to-digital (A/D) converter 112, where the signal is sampled. The sampled signal is processed in a Correlator 113, where a local copy of a C/A code is correlated with the C/A code using which the navigation data has been spread. In this correlation process the correct C/A code and its phase is found. This information about the C/A code presented in FIG. 1 with arrow 121. It is also possible that a correlator can be placed before the A/D converter 112. The correlated digital signal is output to a Digital Signal Processing (DSP) unit 114. This DSP 114 is responsible, for example, for determining which radio symbols are sent. There is a mapping between the symbols and the data bits, so the output from the DSP is the navigation bit stream (arrow 122). The GPS position block 115 of the GPS receiver 100 takes at least the C/A code information (arrow 121) and the navigation bit stream (arrow 122) as input. Typically position determining needs information about the phase of at least three C/A. There can be, for example, three correlators 113, and each is correlating one C/A code with the IF signal, or one correlator 113, which correlates various C/A codes to the signal alternately.

If a GPS receiver is used indoors, typically for example near a door or a window, the received radiation carrying positioning information may be reflected. Reflected right-handed circularly polarized radiation is left-handed circularly polarized radiation. An antenna in a GPS receiver, which is optimal for receiving right-handed circularly polarized radiation, may not detect a left-handed circularly polarized radiation at all, or at least the intensity of the detected signal may be orders of magnitude less than that of the actual signal. Therefore a GPS receiver that is to be used indoors is preferably able to receive efficiently also LHCP radiation. In certain cases, where some of the received GPS signals are reflected and others are not, a GPS receiver should be able to receive at a time LHCP and RHCP signals.

It is generally known that electro-magnetic radiation having any polarization properties can be decomposed into two linear components with certain relative phase and having certain relative amplitudes. Using, for example, two linearly polarized and orthogonal antennas it is possible to receive electro-magnetic radiation having any polarization properties. The problem may, however, be the dynamical changes in the received radiation. When a user carrying a GPS receiver moves, the path of the GPS signal from the satellite transmitter to the GPS receiver may change and, consequently, the polarization properties of the received GPS signal may change.

Schemes for adjusting the properties of an antenna according to the properties of the received signal have been proposed. One alternative is to modify the physical properties of the antenna, but this may require quite complex mechanical arrangements and most probably the modifications cannot be made at a high rate. A second alternative is to use two antennas having different polarization properties and to combine the signals received using these two antennas. Patent application EP 416 264, for example, discusses a system which uses two orthogonal linearly polarized antennas and which is implemented using analog components. The two received signal components have different phases and amplitudes, and a calibration circuit detects the phase and amplitude differences of the received signal components. The phase and amplitude differences are used to adjust variable phase shifters in a combining circuit where 90° hybrid couplers are used to combine the signal components. The calibration circuit continuously compares to signal components, and the signal components are passed through delay lines to the combining circuit. The delay allows the variable phase shifters to be adjusted before the signal components enter the combining circuit.

A similar system could be used in a GPS receiver, but this would require two linearly polarized antennas in the GPS receiver and a calibration circuit and a combining circuit should be built in the RF part (corresponding to the RF part 111 in FIG. 1) related to each antenna. Additional components increase the cost and manufacturing complexity of a device. Furthermore, if the GPS receiver is intended to be integrated within a cellular phone, the number of components should be kept as low as possible because of power consumption and space requirements. A further problem is that with the system presented in EP 416 264, a GPS receiver, which is designed to work indoors, should have more than two antennas: a pair of orthogonal antennas is needed for each GPS signal that is to be received at a time.

Polarization diversity is a known method to increase the quality of a received signal. FIG. 2 presents an example of a polarization diversity receiver 200, which has two antennas 101a and 101b having different polarization properties are used to receive a signal. Each antenna is connected to its own RF block, and the RF blocks 111a, 111b are, in turn, connected to A/D converters 112a, 112b. The digitized signals $\tilde{S}_1$ corresponding to the signal component received with the first antenna 101a and $\tilde{S}_2$ corresponding to the signal component received with the second antenna 101b are complex-valued signals, and they are processed further in the DSP block 201. When polarization diversity is employed, either one of the received signals is used in the reception or both received signals are properly combined and used in the reception. A GPS device employing polarization diversity would typically have two antennas having orthogonal circular polarization properties, so it would have two antennas 101 and two receivers 110. In outdoor environment it would typically employ only the RHCP antenna and the receiver corresponding to the RHCP antenna.

SUMMARY OF THE INVENTION

An object of the invention is to present an antenna-receiver system adaptable to various changes in the properties of the received signal. A further object is to present an antenna-receiver system where the adaptation to changes is arranged using few extra components. A further object is to present an antenna-receiver system where the polarization properties are adjustable. A further object is to present an antenna-receiver system using which it is possible to receive many spread spectrum signals at a time and so that each signal is received in an optimal manner in the sense of polarization.

Objects of the invention are achieved by receiving alternately the signal with at least two antennas having different properties, processing the interleaving signals corresponding to the antennas with a single arrangement, and by constructing from the received signal components a combined signal corresponding to detected or estimated properties of the received signal.

A method according to the invention is a method for receiving radio frequency signal, which method comprises the steps of:
 receiving a first received signal component of the radio signal using a first antenna having first properties and receiving a second received signal component of the radio signal using a second antenna having second properties, which are different from the first properties,
 processing a received signal component to produce a sampled signal component having an In-phase and a Quadrature-phase component,
 producing at least one combined signal, which is a linear combination of at least two sampled signal components,
 selecting at least one set of complex values for coefficients of the linear combination so that a quality of a combined signal corresponding to each set of coefficient values is at a certain time at least equal to a quality of the one of the sampled signal components having the best quality, and
 alternately connecting the antennas via a switching element to radio frequency means so that the received signal components are interleaving each other with respect to time and so that a first part of a certain piece of transmitted information is received with the first antenna and a second part of said piece of transmitted information is received with the second antenna.

The invention relates also to a receiver device, which comprises
 at least a first antenna having certain first properties, which is arranged to receive a first signal component, and a second antenna having certain second properties, which second properties are different from the first properties and which second antenna is arranged to receive a second signal component,
 processing means arranged to process a signal component received with an antenna to a sampled signal component having an In-phase and a Quadrature-phase component,
 combination means arranged to linearly combine sampled signal components to at least one combined signal,
 selection means arranged to select at least one set of complex values for the coefficients of the linear combination so that a quality of a combined signal corresponding to each set of coefficient values is at a certain time at least equal to a quality of the one of the first or second sampled signal components having the better quality, and
 switching means, whose first input is coupled to the first antenna and second input is coupled to the second antenna and whose output is coupled to the processing means and which is arranged to alternately couple the antennas to the processing means so that the received signal components are interleaving each other with respect to time and so that a first part of a certain piece of transmitted information is received with the first antenna and a second part of said piece of transmitted information is received with the second antenna, and in that the processing means are adjusted to process interleaving signal components.

In a method according to the invention, a radio signal is received using at least two antennas, whose properties are different. A first signal component is received with the first antenna, and a second signal component with the second antenna. The signal components are processed and sampled, using for example methods generally known in the art, into a first and second sampled signal components having an In-phase and a Quadrature-phase component. A method according to the invention is characterized in that the first antenna and the second antenna are alternately, in other words in turns, connected to processing means responsible for further processing of the received signals. The first and second signal components are thus interleaved with each other in time. Typically the antennas are alternated so that the duration of connection to the first antenna is substantially the same as the duration of the connection to the second antenna.

The interleaving signal components are sampled to produce digitized signals, which are here called sampled signal components. These sampled signal components are complex-valued, since they also have an In-phase and a Quadrature-phase component. Using the sampled signal components, whereof a first sampled signal component corresponds to the properties of the first antenna and a second sampled signal component corresponds to the properties of the second antenna, it is possible to construct a combined signal matching better the properties of the received signal. For example, by choosing a suitable linear combination of the first and second intermediate sampled signals, it is possible to produce a signal corresponding to any desired polarization properties. The combined signal can be easily produced, for example, using digital signal processing. One or both of the sampled signals are multiplied with a suitable complex factor to produce a correct phase shift and correct amplitude, and thereafter the sampled signal components are summed. The coefficients of the linear combination are typically complex valued. Of course, some values of the coefficients may be real. Term coefficient in this description refers to the coefficients of the linear combination producing the combined signal.

Because the adaptation to properties of the received signal occurs by modifying digitized signals, adaptation to changes in, for example, the polarization or angular properties is quite easily carried out: only the complex coefficients of the linear combination of the signals need to be changed. It is possible to adapt fast to changes in the received signal; this is one of the advantages of the invention. The values for the coefficients are selected so that they produce a better quality for the combined signal than is the quality of either of the received signals. Suitable values for the coefficients can be found, for example, by maximizing the signal-to-noise ratio of the combined signal. The effect of multipath propagation may alternatively be minimized, or coefficient values can be chosen so that they take into account both the signal-to-noise ratio and the multipath propagation. When the polarization changes in a received signal are related to reflections of the signal, there usually is a limited number of candidates for the coefficient values, and the selection of a proper set of values is quite easy.

Similarly as for polarization or spatial diversity, in a method according to the invention it is typically possible to select coefficient values that produce better quality for the combined signal than the quality of an individual signal received with an antenna having certain polarization characteristics. If the first antenna, for example, has polarization properties that optimally match the polarization of the received signal and if the second antenna has orthogonal polarization properties, then the quality of the combined signal is (at least theoretically) the same as that of the signal received with the first antenna. It is possible to modify the angular properties of the antenna combination, in other words the receiving antenna radiation pattern of the antenna combination.

In a method according to the invention, when compared to a conventional non-diversity reception of radio signal, the difference is that there is only an extra antenna and some extra functionality in the part responsible for processing the sampled signals. The extra functionality can be implemented with digital signal processing, so it is quite easy to provide it. The radio frequency part of the receiver can be similar as in a conventional receiver having one antenna. The analog-to-digital conversion, for example, does not need to know that it is processing two interleaving signals corresponding to two antennas instead of a continuous signal received with a certain antenna. A method/receiver according to the invention thus provides an efficient and cost-effective way to adapt to, for example, changes in the polarization of the received signal with nearly as simple equipment as a receiver having certain polarization properties and no adaptation capability. A receiver according to the invention is also more cost-effective than a diversity receiver, because two parallel arrangements processing parallel continuous signals are needed in a diversity receiver instead of one arrangement processing two interleaving signals. The reduction in the number of components in a receiver according to the invention compared to that in a diversity receiver may result in remarkable savings, when large numbers of receivers are manufactured.

In addition, a method or receiver according to the invention is suitable for receiving simultaneously many spread-spectrum radio signals having different polarization properties. For example, when code division is used as a spreading technique, the spread-spectrum signals are typically at a certain frequency band and an antenna suitable for receiving signals at that frequency band is used. The received signal may in this case comprise various spread-spectrum signals corresponding to various spreading codes. Each of these signals may have different polarization properties or it is possible that, for example, two spread-spectrum signals corresponding to two different spreading codes have same polarization properties. A combined signal relating to such a set of coefficient values, which produced good signal quality, may correspond to more than one spread-spectrum signals. It is also possible that each of the received spread-spectrum signals has specific polarization properties, and in this case each combined signal corresponds to one spread-spectrum signal. The correlation with the local copies of the spreading codes may be carried out at various stages after the receipt of the radio signal: the correlation may be carried out using sampled signal components or using combined signal components.

A method or a receiver according to the invention may also be used to receive simultaneously more than one narrow-spectrum radio signals. The polarization properties of an antenna may vary depending on the frequency, so for narrow-spectrum radio signals it may be a bit more challenging to find suitable values for the coefficients of the linear combination. On the other hand, a method according to the invention does not require the polarization properties of the antennas to be, for example, orthogonal, although this may assist in finding suitable values for the coefficients.

BRIEF DESCRIPTION OF THE DRAWING

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
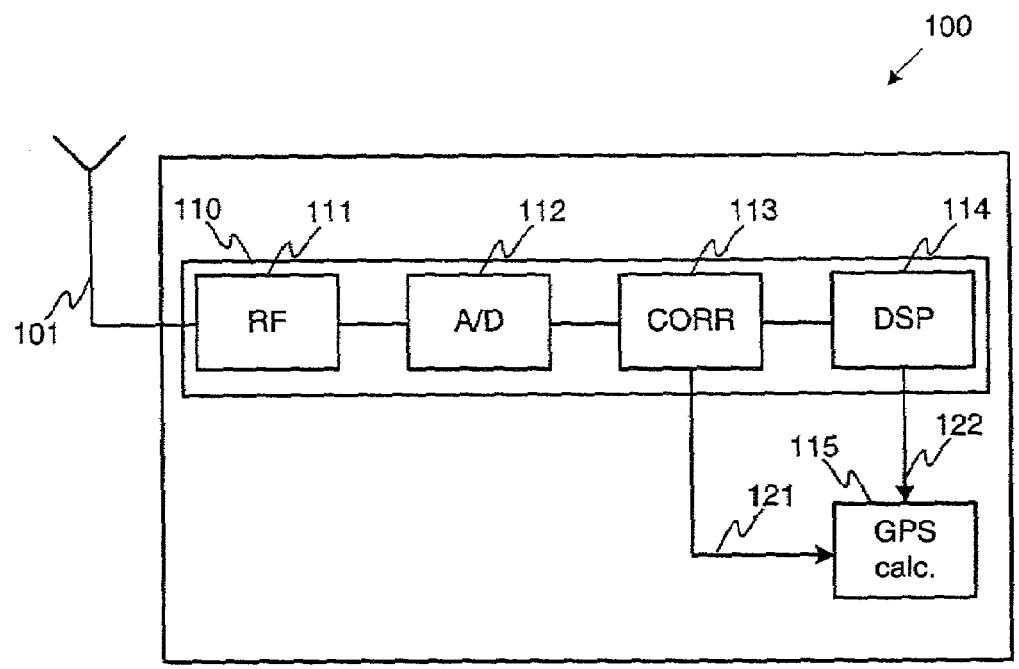
FIG. 1 illustrates schematically a GPS receiver device according to prior art.
Figure 2:
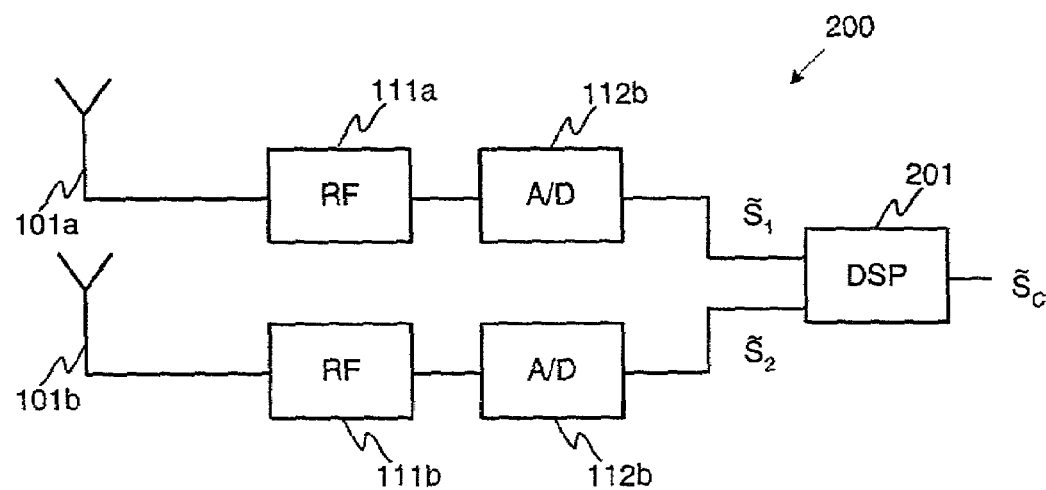
FIG. 2 illustrates schematically a polarization diversity receiver according to prior art.

FIGS. 1–2 are discussed in detail in the description of radio receivers according to prior art.

Figure 3:
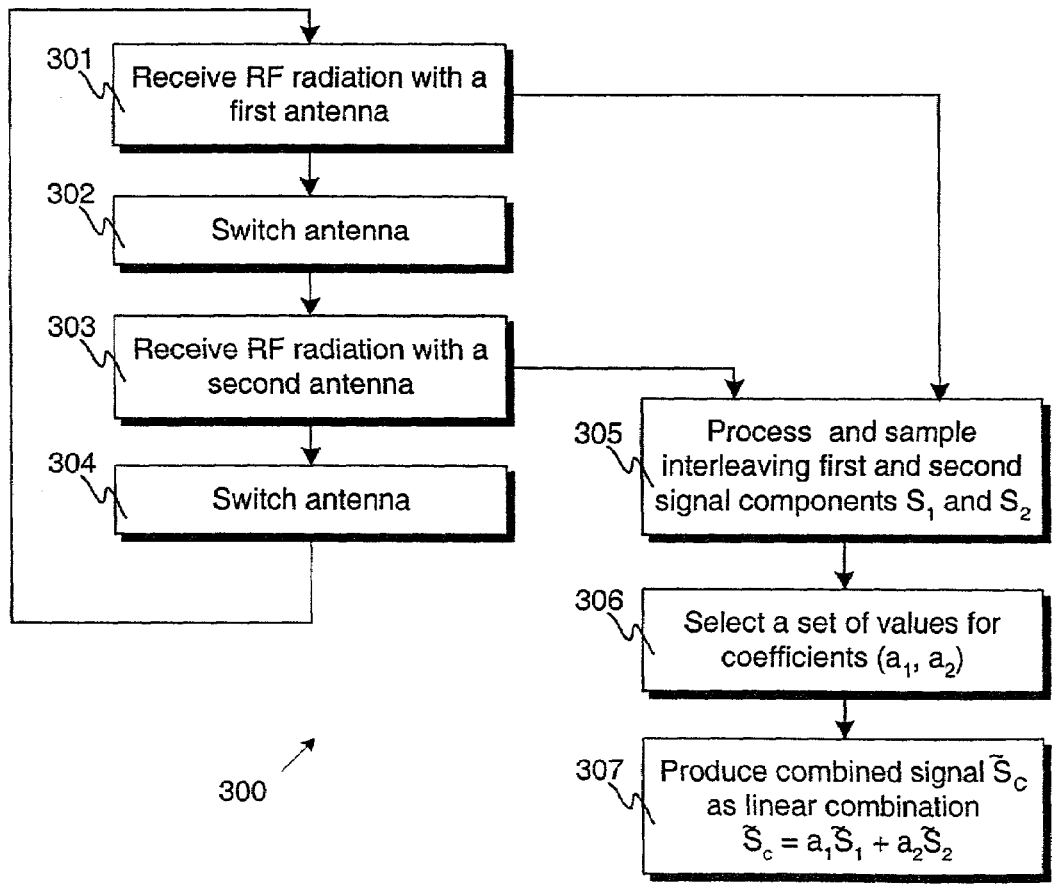
FIG. 3 illustrates a flowchart of a method for receiving radio signal according to a first preferred embodiment of the invention.
Figure 5A:
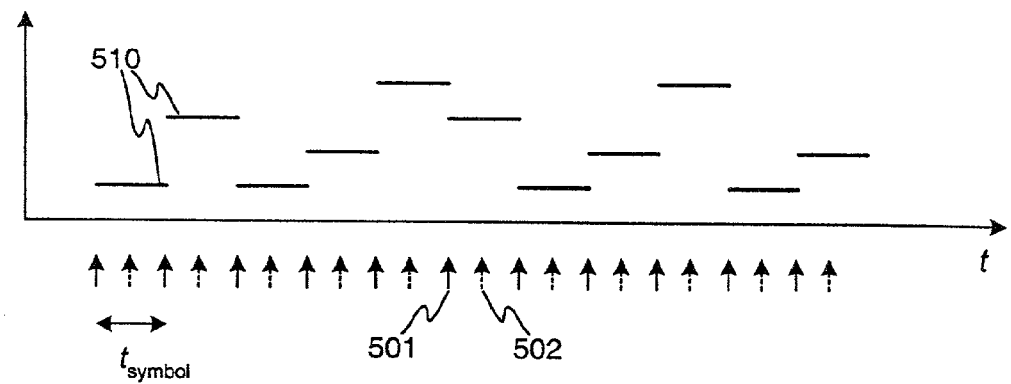
FIG. 5 illustrates schematically the switching of the antennas in methods according to the invention.

FIG. 3 illustrates a flowchart of a method 300 for receiving radio signal according to a first preferred embodiment of the invention. In step 301 radio frequency radiation is received using a first antenna. In step 302 the antenna using which radiation is received is switched to a second antenna, which has different properties than the first antenna. The polarization properties of the antennas or the location of the antennas, for example, may be different. In step 303 radio frequency radiation is received using the second antenna, and in step 304 the antennas are again switched. In a method according to the first preferred embodiment of the invention, the steps 301–304 can be carried out all the time. A first received signal component $S_1$, which corresponds to the first antenna, and a second received signal component $S_2$, which corresponds to the second antenna, are interleaved in time: the first signal component is present, when the first antenna is used in reception, and the second signal component is present, when the second antenna is used in reception. The antennas may be connected via a switching element to a single RF block, and at the input there is alternately the first signal component $S_1$ and the second signal component $S_2$. The time during which each antenna is used in receiving RF signal depends on the applications. If, for example, narrowband radio signal is received, best performance can be obtained by receiving each symbol with both antennas. This is illustrated in FIG. 5a, where a sequence of symbols 510 is represented as a function of time. The horizontal axis is FIG. 5a represents time, and the duration of a symbol $t_{symbol}$ is marked with an arrow in FIG. 5a. The vertical axis in FIG. 5a represents symbol values. A symbol represents a certain number of data bits; the number of data bits depends on the modulation technique. The switching from a first antenna to a second antenna is marked with solid arrows 501 and the switching from the second antenna to the first antenna is marked with dashed arrows 502. The times at which switching occurs in FIG. 5a are examples: the switching may occur, for example, more often, it may occur at irregular intervals, and switching does not have to occur when a symbol changes. The signal received with an antenna between two consecutive switching times is sampled typically several times, but usually at least once.

In step 305 the interleaved signal components $S_1$ and $S_2$ are processed further. Typically an In-phase and a Quadrature-phase component is formed for each received signal and thereafter the signals are sampled. The resulting sampled signals $\tilde{S}_1$ and $\tilde{S}_2$ are complex valued, the real part usually corresponds to the In-phase component and the imaginary part to the Quadrature-phase component. In step 306 a suitable set of coefficient values for the linear combination is selected. Here the set of coefficients is marked as $(a_1, a_2)$. The values for the coefficients are selected to enhance the quality of a combined signal $\tilde{S}_C$, which is a linear combination of the first and second sampled signal components: $\tilde{S}_C = a_1 \tilde{S}_1 + a_2 \tilde{S}_2$. As an indic the quality of the signal, for example a signal-to-noise ratio may be used. It is also possible to minimize the effect of multipath propagation or, for example, to find a suitable balance between the signal-to-noise ratio and minimizing the multipath effects. The coefficients of the linear combination can be used to adapt to changes in polarization of the received radio signal or to adapt to changes in the angular properties of the beam of the received radio signal. Typically methods, which are used to select the coefficient values in diversity receivers, can be used in a method according to the invention for selecting the coefficients values. In step 306 the combined signal corresponding to the selected coefficient values is produced.

Figure 4:
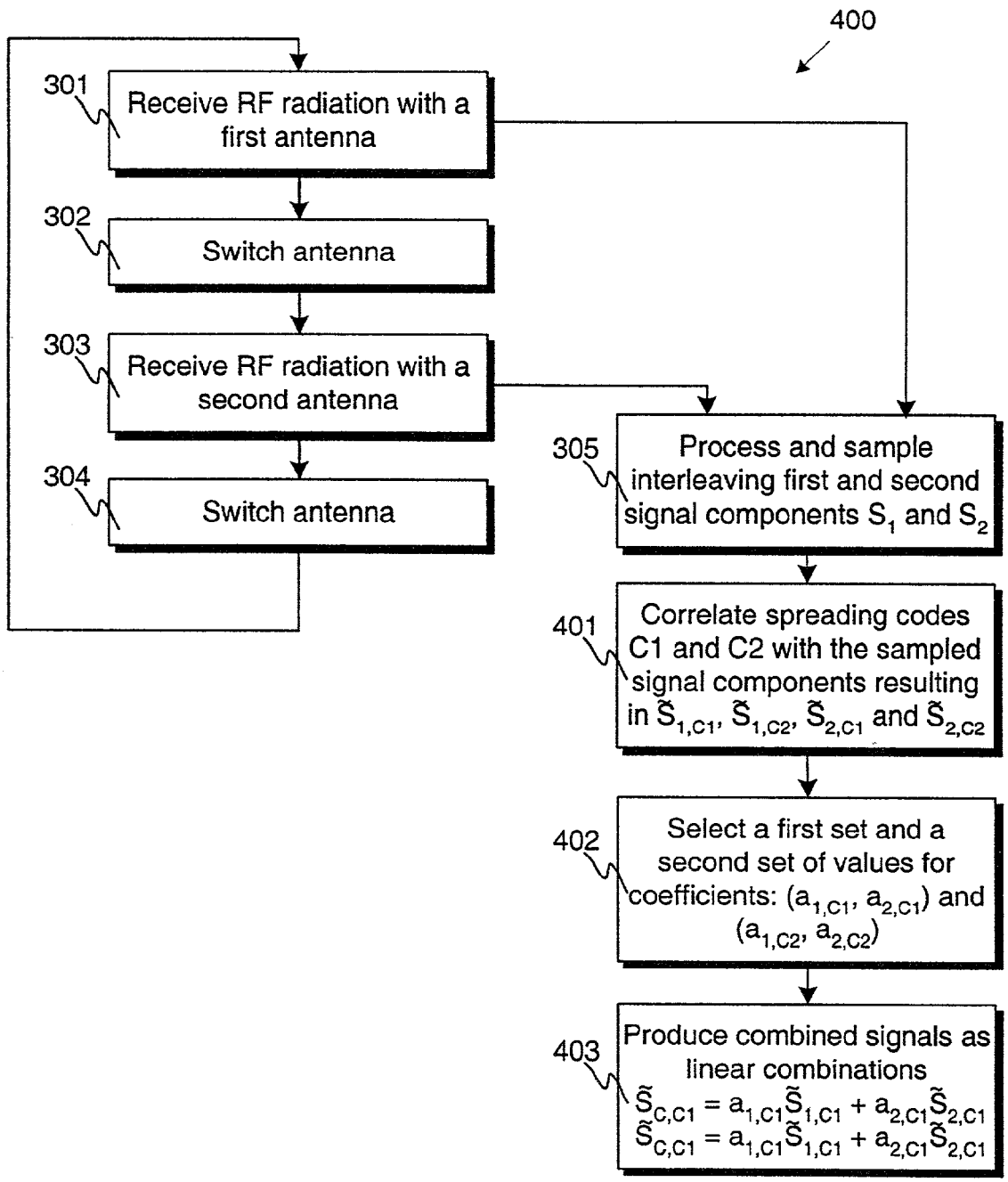
FIG. 4 illustrates a flowchart of a method for receiving radio signal according to a second preferred embodiment of the invention.

FIG. 4 illustrates a flowchart of a method 400 for receiving radio signal according to a second preferred embodiment of the invention. In a method according to the second preferred embodiment of the invention, one or more direct sequence spread-spectrum signals are received. Steps 301–305 in method 400 are similar to those present in method 300. When direct sequence is used to spread narrowband information, the received signals are at some point correlated with local copies of spreading codes C1, C2, C3, etc. In method 400 this is done after the signal components are sampled. In method 400 it is assumed that two spread-spectrum signals, corresponding to spreading codes C1 and C2, are received. Correlation of the spreading codes with the sampled signal components results in the following correlated sampled signal components: $\tilde{S}_{1,C1}$, $\tilde{S}_{1,C2}$, $\tilde{S}_{2,C1}$ and $\tilde{S}_{2,C2}$. Since two spread spectrum-signals are received, it is most probable that a set of values for the coefficients has to be selected independently for each spread-spectrum signal. This is done in step 402, where a first set of coefficient values and a second set of coefficient values are chosen: $(a_{1,C1}, a_{2,C1})$ and $(a_{1,C2}, a_{2,C2})$. In step 403 two combined signals, one for corresponding to each received spread-spectrum signal, is produced: $\tilde{S}_{C,C1} = a_{1,C1} \tilde{S}_{1,C1} + a_{2,C1} \tilde{S}_{2,C1}$ and $\tilde{S}_{C,C2} = a_{1,C2} \tilde{S}_{1,C2} + a_{2,C2} \tilde{S}_{2,C2}$.

It is alternatively possible to perform the correlation of the local copies of the spreading codes with a combined signal $\tilde{S}_C$. In this case the correlation step 401 is performed only after the combined signal is produced, and the flowchart of this kind of method is similar to that of method 300, step 401 is just added after step 307. This method works best when the spread-spectrum signals have similar polarization and/or angular properties. A third option is to perform the correlation of the local copies of the spreading codes already when processing the received signals in step 305. In this case the correlation can be performed using analog signal components, in other words before sampling the received signal components.

Figure 5B:
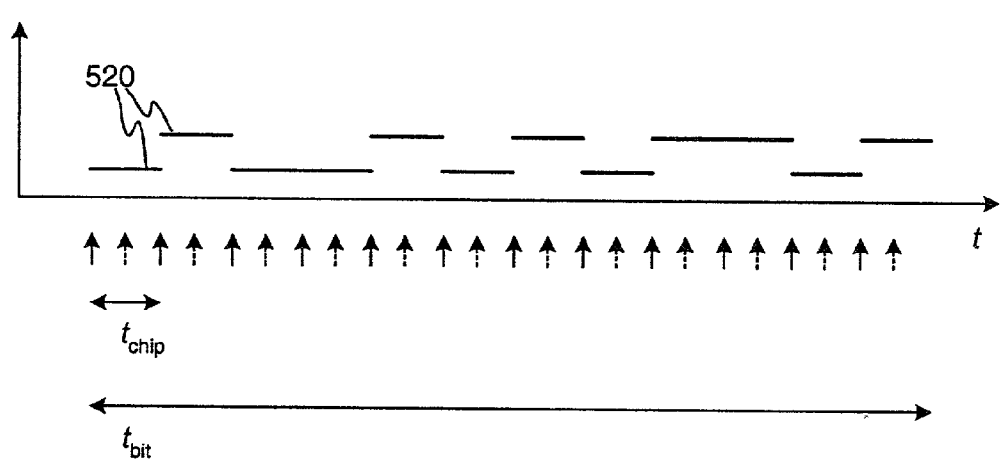
Figure 5C:
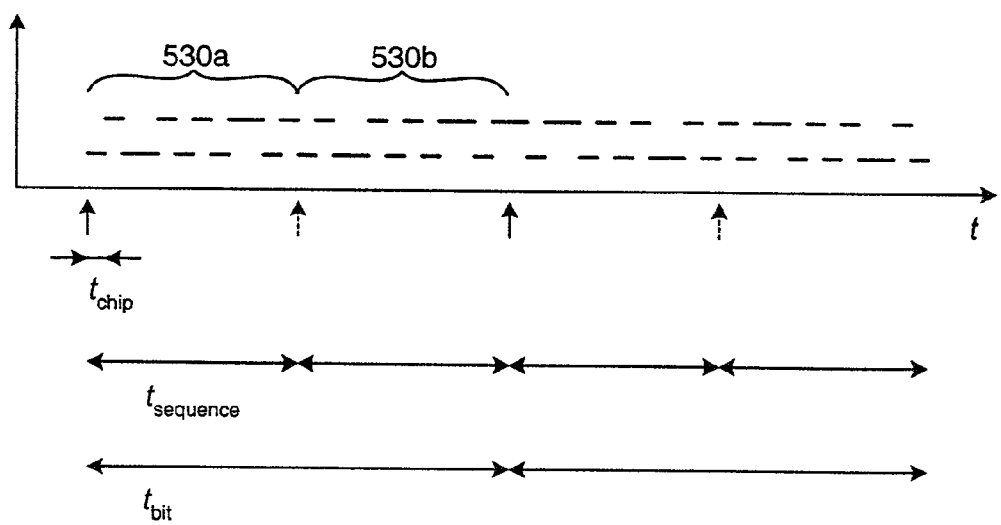

When a spread-spectrum signal is received, it is possible to switch the antennas, for example, twice during each chip or, if the spreading code sequence is repeated at least partly during a data bit, twice during each data bit. A certain chip—data bit combination is thus received with at least two antennas, and the chip—data bit combination can be resolved using the signal components. FIG. 5b illustrates schematically the switching of antennas so that each chip 520 is received with two antennas. The vertical axis represents the value of a chip-data bit combination, but otherwise FIG. 5b is similar to FIG. 5a. The duration of a chip $t_{chip}$ and the duration of a data bit $t_{bit}$ are presented in FIG. 5b with arrows. The ratio of the chip and data bit durations in FIGS. 5b and 5c is just an example, and the switching times presented with arrows in FIG. 5b are also examples. A receiver, where antennas are switched very frequently, for example for each chip, may need to have some equipment in duplicate.

FIG. 5c illustrates schematically a signal where a sequence of chips is repeated twice during each data bit. The duration of a chip sequence $t_{sequence}$ is marked in FIG. 5c with an arrow. In this case it is possible to switch the antennas for example, at least twice during a data bit. In FIG. 5c, a first copy of the chip sequence 530a, combined with a certain data bit, is received with the first antenna and a second copy of the chip sequence 530b, combined with the same data bit, is received with the second antenna. A method according to the invention may be applicable also a chip sequence is repeated only partly during a data bit. The switching times illustrated in FIG. 5c are again examples; there are many other possible ways to switch the antennas according to the invention. Typically when the antennas are switched for chip sequences, there is no need for duplicate equipment in the RF block of a receiver.

In GPS, for example, the C/A is a pseudorandom binary code consisting of 1023 chips and it is repeating itself every millisecond. The chip rate of the C/A code is thus 1.023 Mchip/s. The navigation information rate is 50 b/s, so during each navigation data bit the C/A code sequence is repeated 200 times. The duration of a C/A code sequence is called an Epoch. When GPS signal is received using a method according to the invention, it is thus possible, for example, to receive the signal with each antenna for a certain integer multiple of Epochs or to switch the antennas, for example, for every Epoch or for every other Epoch. In GPS typically at least three navigation signals are received simultaneously. For each satellite, the duration of the C/A code sequence is the same, and it is possible to receive many navigation signals simultaneously and find an optimal set of coefficient values for each navigation signal separately, for example. The different C/A codes relating to different GPS satellites may have certain phase difference with each other, but a method according to the invention can be applied successfully: for some of the navigation signals, the antennas may be switched in the beginning of a C/A code sequence and for other navigation signals the switch occurs at another point of the C/A code sequence. In any case, for each navigation signal a whole Epoch may be received with each antenna. It is, of course, possible to receive in a similar manner also other spread-spectrum signals having a spreading code repeated during a data bit than GPS navigation signals.

Figure 6:
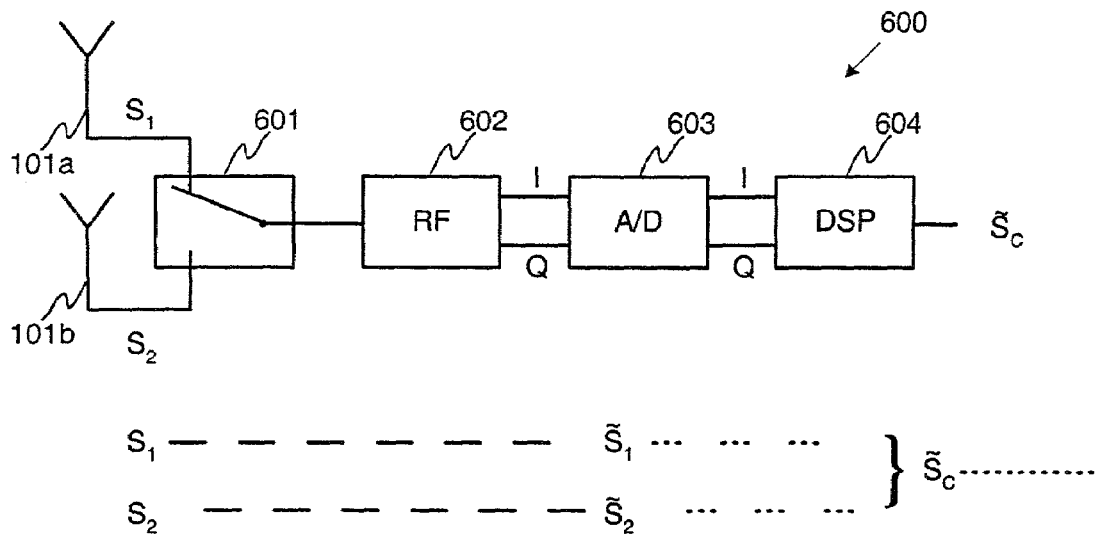
FIG. 6 illustrates schematically a receiver according to a first preferred embodiment of the invention.

FIG. 6 illustrates schematically a receiver 600 according to a first preferred embodiment of the invention. The receiver 600 has two antennas 101a and 101b, which have different properties. The polarization properties of the antennas or the location of the antennas, for example, may be different. The antennas 101a and 101b are both connected to inputs of a switching element 601. There may be a preamplifier for each antenna before the switch, but these preamplifiers are not shown in FIG. 6. The switching element is arranged to alternately connect either one of the antennas to a radio frequency (RF) block 602. The RF block 602 processes the received signal components $S_1$ and $S_2$, and outputs signal components having an In-phase (I) and a Quadrature-phase (Q) components. The signals from the outputs of the RF block 602 are lead to inputs of an analog-to-digital (A/D) converter 603, and sampled signal components $\tilde{S}_1$ and $\tilde{S}_2$ are further lead to digital processing means 604 for further processing. The selection of the coefficient values for the linear combination is typically carried out in the processing means 604, and the combined signal $\tilde{S}_C$ is also produced there.

The lower part of FIG. 6 presents schematically the signal components at the various parts of the receiver 600. Between the antennas 101a, 101b and the A/D converter 603, the signal components are typically analog signals (presented in FIG. 6 with a solid line) and they occur alternately in time. After the A/D converter 603 the signals are sampled, and they are digital. This is presented in FIG. 6 with dashed line. In the A/D converted 603 and between the A/D converter and processing means 604 the sampled signals occur alternately in time. After the processing means there is at least one digital combined signal.

The RF block 602 and A/D converter 603 are capable of processing to interleaving signals. Simple modifications should be sufficient to convert an RF block or an A/D converter inputting a single continuous signal to a RF block 602 or an A/D converter 603 capable of processing two interleaving signals. The main modification in a receiver 600 according to the invention, when compared to a conventional receiver having one antenna, is the switching element 601 and some additional features in digital processing means 604.

Figure 7:
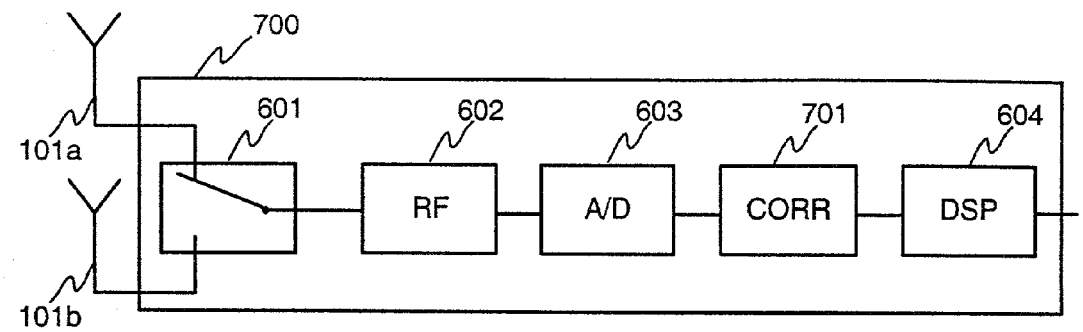
FIG. 7 illustrates schematically a receiver according to a second preferred embodiment of the invention.

FIG. 7 illustrates schematically a receiver 700 according to a second preferred embodiment of the invention. The receiver 700 comprises correlation means 701. It is typically located between the A/D converter 603 and the digital processing means 604.

Figure 8:
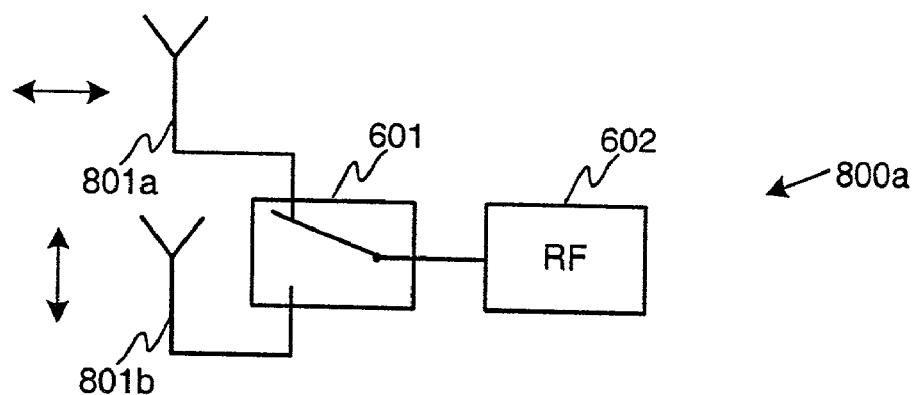
FIG. 8 illustrates schematically various antenna configurations applicable in receivers according to the invention.
Figure 8:
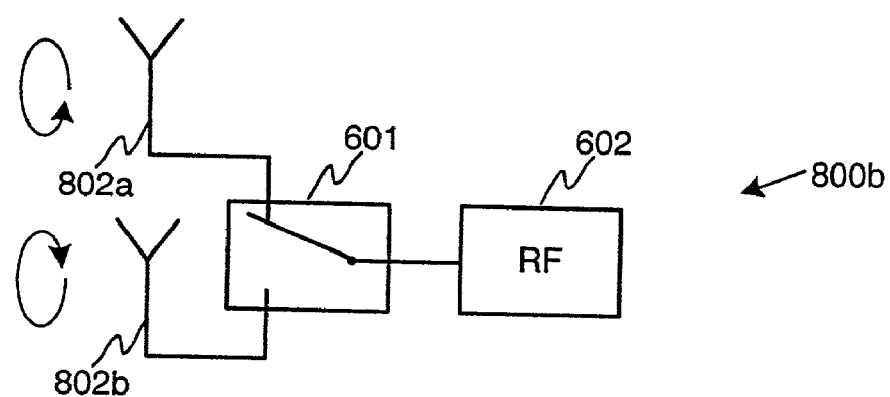
Figure 8:
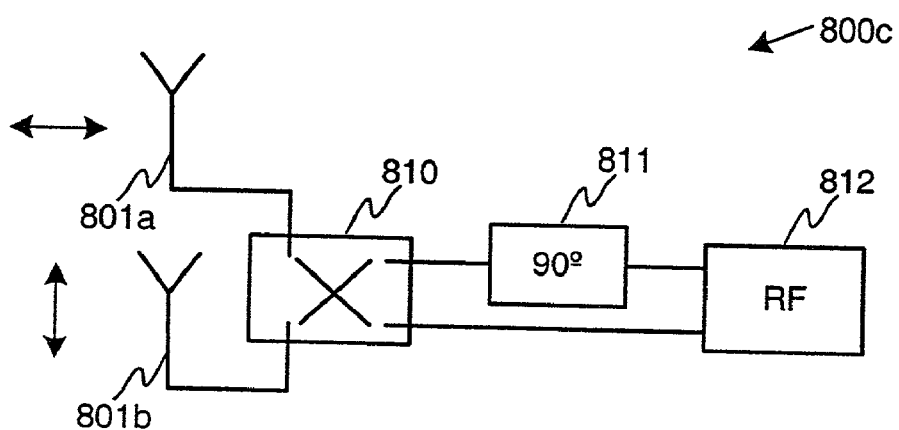

FIG. 8 illustrates schematically various antenna configurations applicable in receivers according to the invention. The antenna—receiver configuration 800a comprises a switch 601 and two separate linearly polarized antennas: antenna 801a is horizontally polarized and antenna 801b is vertically polarized. It is possible to choose the values for the coefficients of the linear combination so that any polarization properties can be simulated for the antenna configuration 800a. For example, circular polarization or elliptical polarization can be simulated.

The antenna—receiver configuration 800b comprises a switch 601 and two separate circularly polarized antennas: antenna 802a is a right hand circularly polarized antenna and antenna 802b is a left hand circularly polarized antenna. Again, it is possible to choose the values for the coefficients of the linear combination so that any polarization properties can be simulated for the antenna configuration 800b. The antenna—receiver configuration 800b is most suitable for receiving circularly polarized radiation: depending on the number of reflections, for example, the signal is either a LHCP signal or a RHCP signal.

The antenna—receiver configuration 800c comprises two linearly polarized antennas: antenna 801a is horizontally polarized and antenna 801b is vertically polarized. The antennas in this antenna-receiver configuration are connected to a switch 810, which has two outputs. One of the outputs is directly connected to a RF block 812, and the other output is connected to the RF block 812 via a 90° phase shifter 811. Switch 810 is such that both antennas are coupled to the RF block simultaneously: the polarization properties of the received radiation are either LHCP or RHCP. Again, it is possible to choose the values for the coefficients of the linear combination so that any polarization properties can be simulated for the antenna configuration 800b. The antenna—receiver configuration 800c is also most suitable for receiving circularly polarized radiation.

If it is detected that the received radiation has polarization properties, which match the properties of one of the antennas, it is possible to stop switching the antennas and receive the signal using only the suitable antenna. The properties of the received signal can be detected, for example, from the set of values selected for the coefficients. This can be schematically represented, for example, in FIG. 3 as a feedback from step 306 to steps 302 and 304 or in FIG. 6 as a feedback from digital processing means 604 to the switch 601. The position of the switch 601 may be selected according to the instructions received from the digital processing means 604.

Figure 9:
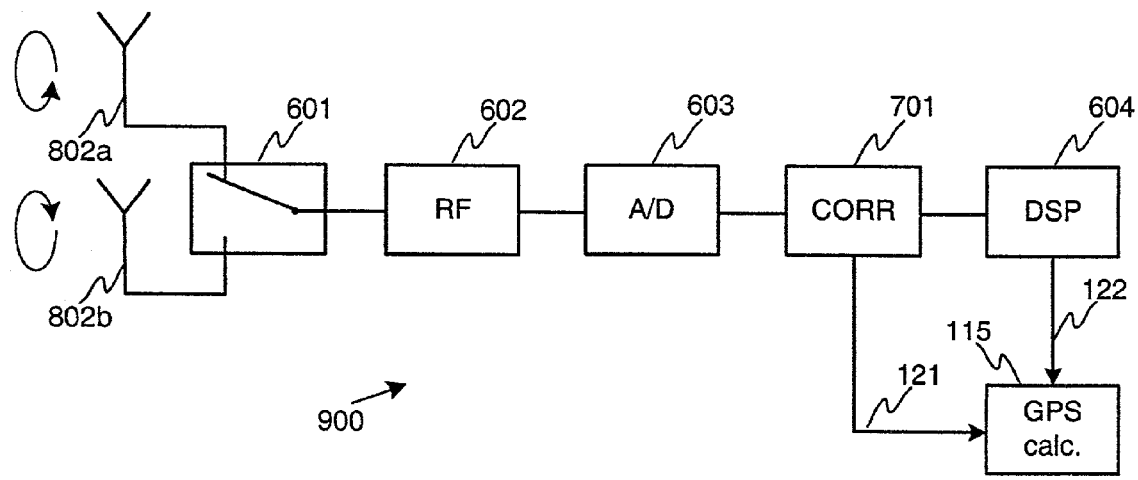
FIG. 9 illustrates schematically a GPS receiver according to a third preferred embodiment of the invention.

FIG. 9 illustrates schematically a GPS receiver 900 according to a third preferred embodiment of the invention. A GPS receiver 900 preferably has two circularly polarized antennas 802a and 802b, because GPS navigation signals are circularly polarized. When the path of navigation signal from a GPS satellite to the GPS receiver 900 is line-of-sight (LOS), the navigation signal is RHCP and the antenna having RHCP properties can be used. In other words, the switch 602 is kept in a constant position. Typically at least three navigation signals are received simultaneously. If at least one of them is reflected, it is advisable to use both antennas 802a and 802b. For the LOS navigation signals (or navigation signals reflected an even number of times) it is possible to use only the signal received with the RHCP antenna, and for the odd number of times reflected navigation signals it is possible to use the signal received with the LHCP antenna. This corresponds to a situation, where one of the signal components is omitted in the linear combination. It is also possible to combine the signals, if a better quality for the combined signal is obtained.

The received signal components are sampled in the A/D converter 603, and the sampled signals are correlated with C/A codes in correlation block 701. Information about the timing of the C/A codes and phase of the C/A codes is delivered (arrow 121) to GPS calculation block 115. The signal components are processed in the DSP block 604 to form a good quality combined signal. The navigation information is determined from the combined signal, and it is delivered (arrow 122) to the GPS calculation block 115. The GPS calculation block 115 is responsible for determining, for example, the location of the GPS receiver using the navigation information and the information about the C/A codes.

Figure 10:
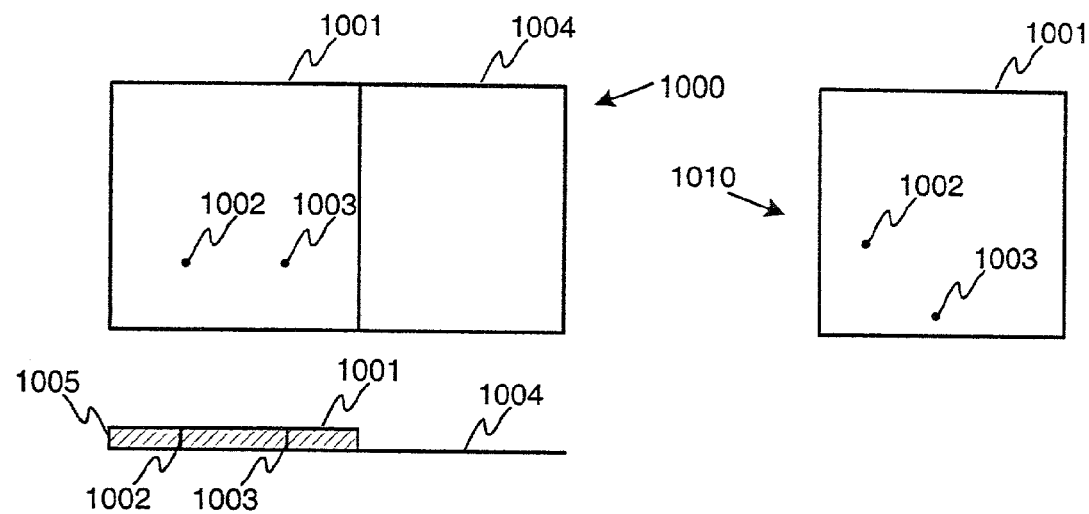
FIG. 10 illustrates a dual polarized patch antenna and a dual sense patch antenna applicable in receivers according to the invention.

FIG. 10 illustrates a dual sense patch antenna 1000 and a dual polarized patch antenna 1010 applicable in receivers according to the invention. A patch antenna comprises a conducting plate 1001, which is roughly square in form and which is superposed over a conducting second plate 1004. Between the plates there typically is some insulating material 1005, which may also act as a support for the plate 1001. There may be one or more than one feed points in a patch antenna. The position of a feed point determines the polarization properties of the antenna. The dual sense patch antenna 1000 has two feed points: the feed point 1002 is a RHCP feed point and the feed point 1003 is a LHCP feed point. The vertical sides (as presented in FIG. 10) of the plate 1001 are in a dual sense patch antenna typically 2% longer than the horizontal sides. The dual sense patch antenna 1000 is an example implementation of the antennas 802a and 802b in the antenna—receiver configuration 800b.

The dual polarized patch antenna 1010 has also two feed points: one corresponds to vertical polarization and the other to horizontal polarization. In a dual polarized patch antenna 1010 the sides of the plate 1001 are usually equal. The dual polarized patch antenna 1010 is an example implementation of the antennas 801a and 801b in the antenna—receiver configurations 800a and 800c. A dual sense patch antenna or a dual polarized patch antenna is small and can be mounted to small devices.

A second example of an antenna type that is small and can be used in small devices is a Planar Inverted-F Antenna (PIFA), which has linear polarization properties. The mechanical structure of PIFA resembles that of a patch antenna, but the plate 1001 is galvanically connected to the plate 1004 in one of its corners. There is one feed point, and the direction of the linear polarization is determined by the direction of the plates 1001 and 1004. Typically the plate 1001 is rectangular but not square in a PIFA.

Figure 11:
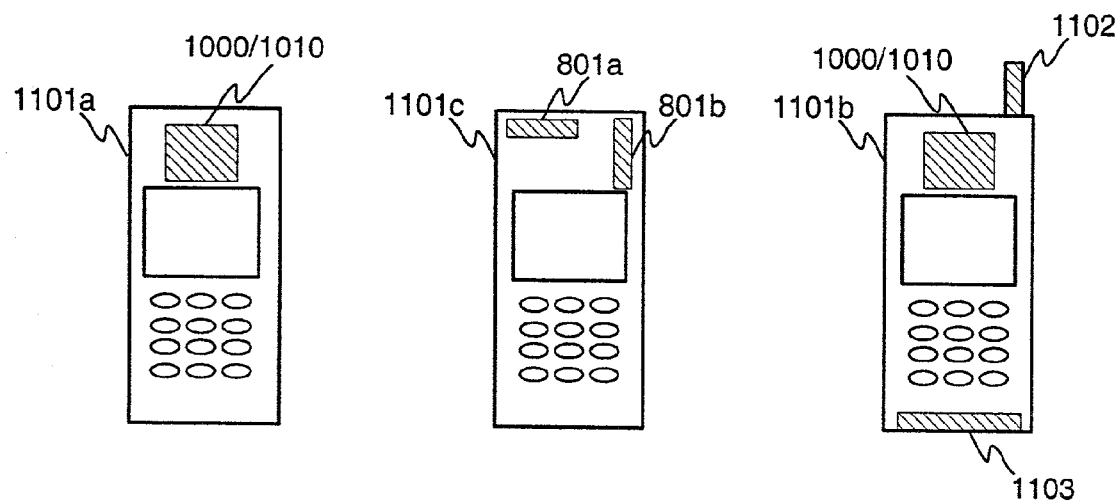
FIG. 11 illustrates mobile stations according to further preferred embodiments of the invention.

FIG. 11 illustrates mobile stations 1101a, 1101b and 1101c according to further preferred embodiments of the invention. All these mobile stations comprise an integrated GPS receiver similar to that presented in FIG. 9. In the mobile station 1101a, the antenna system related to the GPS receiver is a dual sense patch antenna 1000 or a dual polarized patch antenna 1010. A patch antenna 1000 or 1010 can be located, for example, below the earpiece of a mobile station. In the mobile station 1101b, the main antenna 1102 and a spatial diversity antenna 1103 relating to the radio transmission with a cellular network are also presented. The mobile station 1101c comprises for the reception of GPS signal two linearly polarized antennas 801a and 801b, which are by the way of example orthogonally located in the mobile station. The linearly polarized antennas 801a and 801b may be, for example, two PIFAs.

Although in the above description the use of two antennas is explained, it is possible to use more than two antennas in a method/receiver according to the invention. The combined signal is in this case a linear combination of signal components received with more than two antennas. The use of more antennas may be advantageous, for example, when the antennas are switched in order to adjust the angular properties of the antenna.

What is claimed is:

1. A method for receiving a radio frequency signal, said method comprising:
   receiving a first received signal component of the radio frequency signal using a first antenna having first properties, and receiving a second received signal component of the radio frequency signal using a second antenna having second properties, which are different from the first properties,
   processing the first received signal component to produce a first sampled signal component having an In-phase and a Quadrature-phase component, and processing the second received signal component to produce a second sampled signal component having an In-phase and a Quadrature phase component,
   producing at least one combined signal that is a linear combination of at least the first sampled signal components and the second sampled signal component, and
   selecting at least one set of complex values for coefficients of the linear combination so that a quality of the combined signal corresponding to each set of coefficient values is at a certain time at least equal to a quality of the one of the first sampled signal components and the second sampled signal component having the best quality.

2. A method according to claim 1, wherein the set(s) of coefficient values is/are selected using the signal-to-noise ratio as a measure of the quality of a signal.

3. A method according to claim 1, wherein the set(s) of coefficient values is/are selected by minimizing the effect of multipath propagation.

4. A method according to claim 1, wherein the polarization properties of the combined signal are adjusted.

5. A method according to claim 1, wherein the angular properties of the combined signal are adjusted.

6. A method according to claim 1, wherein the spatial properties of the first antenna and the second antenna are different.

7. A method according to claim 1, wherein the radio signal is a narrow spectrum signal comprising a sequence of symbols and a piece of transmitted information is a symbol, said piece of transmitted information being received by alternately connecting the first antenna and the second antenna to radio frequency means such that a first part of said piece of transmitted information is received with the first antenna, and a second part of said piece of transmitted information is received with the second antenna.

8. A method according to claim 1, wherein a spread spectrum signal, corresponding to at least one sequence of data bits spread with a spreading code, is received, and said method further comprises the step of correlating the received signal components at a certain phase after the receipt of signal components with at least one local spreading code.

9. A method according to claim 8, wherein the received signal components are correlated with the local spreading code(s) before they are sampled.

10. A method according to claim 8, wherein the sampled signal components are correlated with the local spreading code(s).

11. A method according to claim 8, wherein the combined signal(s) are correlated with the local spreading code(s).

12. A method according to claim 8, wherein the spreading code consists of a certain repeated sequence of chips, which sequence lasts a certain time period shorter than half a duration of a data bit, and a piece of transmitted information comprises a first sequence of chips, which is combined with a certain data bit, and at least part of a second sequence of chips, which is combined with the same data bit, where the first sequence of chips combined with the data bit is received with the first antenna and at least part of the second sequence of chips combined with the data bit is received with the second antenna, said piece of transmitted information being received by alternately connecting the first antenna and the second antenna to radio frequency means such that a first part of said piece of transmitted information is received with the first antenna, and a second part of said piece of transmitted information is received with the second antenna.

13. A method according to claim 12, wherein the received signal comprises Global Positioning System signals, the local spreading codes are Coarse Acquisition codes and the duration of a repeated sequence of chips is an Epoch.

14. A method according to claim 8, wherein a piece of transmitted information is a chip, said piece of transmitted information being received by alternately connecting the first antenna and the second antenna to radio frequency means such that a first part of said piece of transmitted information is received with the first antenna, and a second part of said piece of transmitted information is received with the second antenna.

15. A method according to claim 1, wherein, said first antenna and said second antenna are alternately connected via a switching element to radio frequency means so that the first and the second received signal components are interleaving each other with respect to time, said switching elements being operative based on a duration of a parameter of the first and the second received signal components received with said antennas, wherein said parameter is one of the following: a bit, an epoch, a symbol or a chip sequence, and wherein a switching time of the first and the second antennas enables reception of a single symbol by both of said first and said second antennas to compensate for changes in polarization of a received signal.

16. A receiver device comprising:
at least a first antenna having certain first properties, which is arranged to receive a first signal component, and a second antenna having certain second properties, which second properties are different from the first properties, and which second antenna is arranged to receive a second signal component,
a processing element arranged to process the first signal component received with the first antenna to produce a first sampled signal component having an In-phase and a Quadrature-phase component, and to process the second signal component received with the second antenna to produce a second sampled signal component having an In-phase and a Quadrature-phase component,
a combination element arranged to produce at least one combined signal that is a linear combination of at least the first sampled signal components and the second sampled signal component and
a selection element arranged to select at least one set of complex values for coefficients of the linear combination so that a quality of the combined signal corresponding to each set of coefficient values is at a certain time at least equal to a quality of the one of the first or the second sampled signal components having the better quality.

17. A receiver device according to claim 16, wherein the selection element is arranged to select the set of complex values based on the quality of the received signal components during a connection of one of the antennas to the processing element for a certain period of time.

18. A receiver device according to claim 16, wherein the polarization properties of the first antenna and the second antenna are different.

19. A receiver device according to claim 18, wherein the first antenna is right hand circularly polarized antenna and the second antenna is a left hand circularly polarized antenna.

20. A receiver device according to claim 19, wherein the first antenna and the second antenna are arranged as a single dual sense antenna having a first feed for right hand circularly polarized operation and a second feed for left hand polarized operation.

21. A receiver device according to claim 20, wherein the dual sense antenna is a dual sense patch antenna.

22. A receiver device according to claim 18, wherein the first antenna is a first linearly polarized antenna and the second antenna is a second linearly polarized antenna.

23. A receiver according to claim 22, wherein the first antenna and the second antenna are arranged as a single dual polarized antenna having a first feed for the first linearly polarized operation and a second feed for the second linearly polarized operation, which is different from the first linearly polarized operation.

24. A receiver device according to claim 22, wherein the dual polarized antenna is a dual polarized patch antenna.

25. A receiver device according to claim 22, wherein the first antenna is a first planar inverted F antenna and the second antenna is a second planar inverted F antenna, whose direction is different from the direction of the first antenna.

26. A receiver device according to claim 22, wherein the first linearly polarized antenna is arranged to have polarization properties which are substantially orthogonal to the polarization properties of the second linearly polarized antenna.

27. A receiver device according to claim 16, wherein the angular properties of the first antenna and the second antenna are different.

28. A receiver device according to claim 16, wherein the spatial properties of the first antenna and the second antenna are different.

29. A receiver device according to claim 16, further comprising correlation means arranged to correlate at least one local spreading code with at least one of the following: the combined signal, the first sampled signal component, and the second sampled signal component.

30. A receiver device according to claim 29, wherein said receiver device is a Global Positioning System receiver device.

31. A receiver device according to claim 16, wherein said receiver device is a mobile station arranged to receive Global Positioning System signals using the first and second antennas.

32. A receiver device according to claim 16, comprisng a switching element to switch continually between said first antenna and said second antenna based on the duration of a parameter of the first and the second received signal components received by said antennas, such that said first antenna and said second antenna are alternately connected via said switching element to radio frequency means so that the first and the second received signal components are interleaving each other with respect to time, wherein said parameter is one of the following: a bit, an epoch, a symbol or a chip sequence, and wherein a switching time of the first and the second antennas enables reception of a single symbol by both of said first and said second antennas to compensate for changes in polarization of a received signal.

* * * * *